C. A. McPHETRIDGE.
Cotton Gin.
No. 16,096.
Patented Nov. 18, 1856.
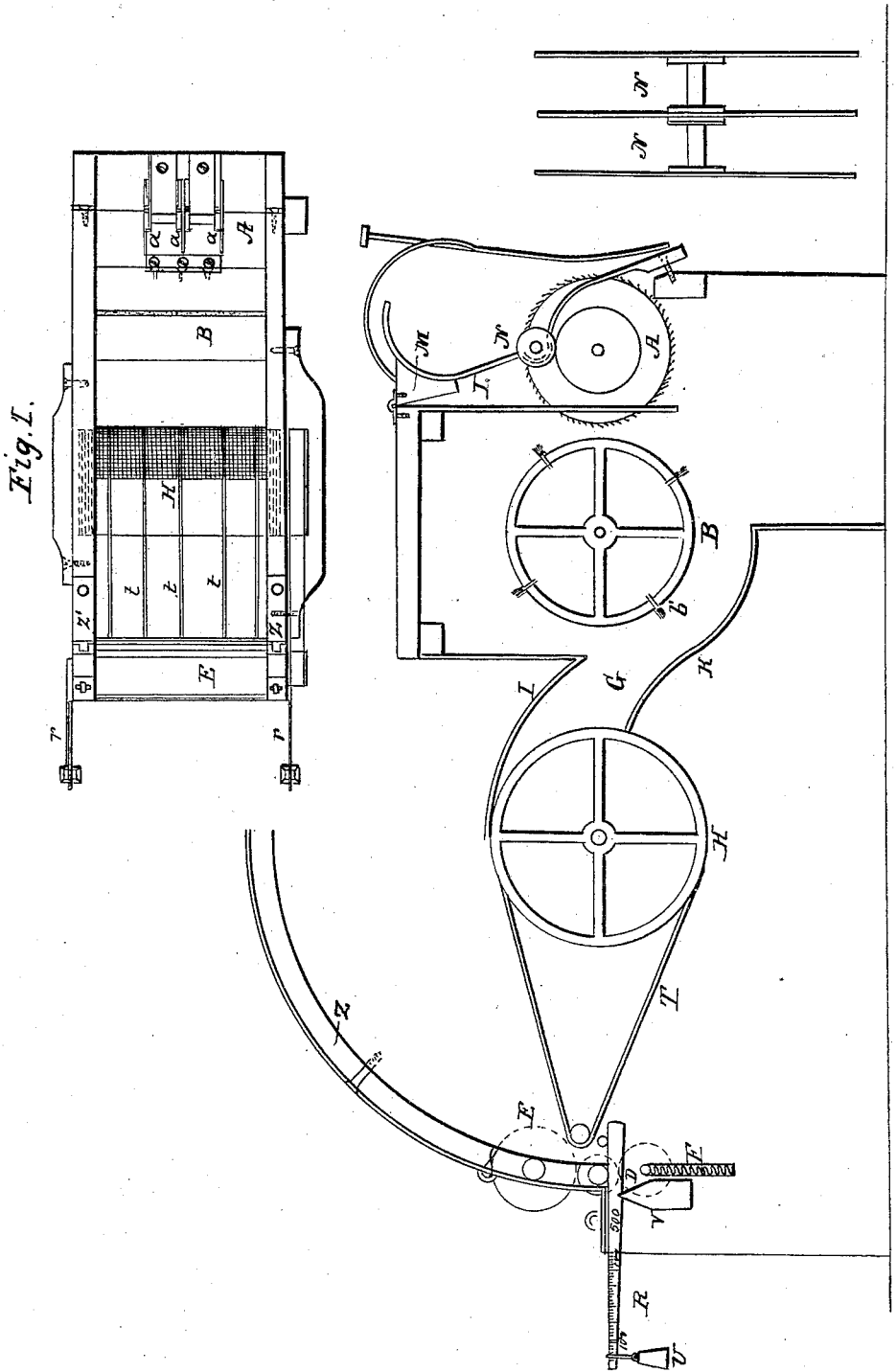

UNITED STATES PATENT OFFICE.

C. A. McPHETRIDGE, OF ST. LOUIS, MISSOURI.

IMPROVEMENT IN COTTON-GINS.

Specification forming part of Letters Patent No. 16,096, dated November 18, 1856.

*To all whom it may concern:*

Be it known that I, C. A. McPHETRIDGE, of St. Louis, in the county of St. Louis and State of Missouri, have invented a new and useful Improvement in Cotton-Gins; and I do hereby declare that the following is a full and exact description thereof, reference being had to the accompanying drawings, making part of this specification—

Figure 1 being a longitudinal vertical section of my improved machine; Fig. 2, a plan of the machine; Fig. 3, a view of the grate-bar, spool, and saws.

My invention relates to improvements in the cotton-gin.

To enable others skilled in the art to make and use my invention, I will proceed to describe its construction and operation.

I employ a series of friction-spools between the saws.

The object of the friction-spools N is to prevent the friction of the saws A on the sides of the breast-plate where it runs through, and to increase the power by means of the leverage of the spools. They also lift all extraneous substances over the saw and allow them to pass with the roll and fall off with the seed. The spools are so arranged that the peripheries of the spools stand above the periphery of the saw. Consequently as the saw passes between the spools they are made to revolve with the saw in the same direction. As soon as the staple is brought in contact with the spool, it is regularly stripped off and drawn downward between the spools on the further side, while on the front or side of contact it, with the seed in it and all other substances, is lifted up and follows the roll, thus rendering it impossible for the gin to choke or break.

L is the breast-plate, or, in ordinary gins, the grate-bars. This breast-plate I form out of a single piece of metal. I first get the required size. Then, by means of a die or dies, I cut out the spaces for the reception of the saws and spools, as seen in Fig. 3. It is then formed on rollers to the shape desired, and can be fastened to two pieces of wood—one at bottom and one at top—and by means of hinges hung to the gin.

The brush B is for the purpose of removing the cotton from the saws, and is the ordinary brush for such purpose, and conveys it into the flue G, where it is carried by the blast from the revolving brush against the gauze-cylinder H. It is then carried around on the same until it comes in contact with the cords T T, which are geared around said cylinder flush with its outer surface, extending forward to roller O, carrying the felted cotton on the cords or apron until it comes to the roller O, when it is lifted by hand onto the bale-roller F, and is a hollow perforated cylinder wound around with cloth of sufficient thickness, and is kept always in contact with the cotton on bale-roller F by means of a spiral or other spring. This cylinder is filled with water or steam, as is convenient, for the purpose of keeping the cotton bale-roller moist, laying the fiber. The heated cylinder E, immediately above the bale-roller, is for the purpose of compressing and smoothing the cotton on the bale-roller. This cylinder has its bearings in guides Z, which is a segment of a circle described from the center of wheel H. The sponge-roller may be attached to the heated cylinder, against the periphery of which it acts by means of an arm extended from the center of both rollers. The cylinder E, being loose in its bearings, is caused to rise in the guide Z as the cotton increases on the bale-roller F.

The bale having been made of the requisite weight of good cotton, I throw into the gin inferior cotton, which is ginned as above, with which I inclose the bale, and then, to further protect it, I cover the same with a solution of shellac or other suitable material. The bale is weighed by means of scale-beam R and weight U. The journals of the roller F rest on the scale-beam R, which rests on fulcrum V. The weight U is placed at the required weight, so that when the cotton on the roller F has become of the required weight it lifts the weight and a bell may be rung to notify an attendant.

Having thus fully described the construction and operation of my invention, what I claim as new, and desire to secure by Letters Patent, is—

1. The friction-spools N, arranged as herein described, in combination with the saw, for the purposes described.

2. The breast-plate, as described, in combination with the spools N, as set forth.

C. A. McPHETRIDGE.

Witnesses:
JOHN S. HOLLINGSHEAD,
JOHN A. MISE.